US008943715B2

(12) United States Patent
Gross et al.

(10) Patent No.: US 8,943,715 B2
(45) Date of Patent: Feb. 3, 2015

(54) LUBRICATION PUMP

(71) Applicant: Harnischfeger Technologies, Inc., Wilmington, DE (US)

(72) Inventors: Matthew L. Gross, West Allis, WI (US); Joseph J. Colwell, Hubertus, WI (US)

(73) Assignee: Harnischfeger Technologies, Inc., Wilmington, DE (US)

( * ) Notice: Subject to any disclaimer, the term of this patent is extended or adjusted under 35 U.S.C. 154(b) by 21 days.

(21) Appl. No.: 13/937,696

(22) Filed: Jul. 9, 2013

(65) Prior Publication Data

US 2014/0007468 A1    Jan. 9, 2014

Related U.S. Application Data

(60) Provisional application No. 61/669,366, filed on Jul. 9, 2012.

(51) Int. Cl.
| | |
|---|---|
| *E02F 3/407* | (2006.01) |
| *E02F 3/42* | (2006.01) |
| *E02F 9/22* | (2006.01) |
| *F04B 23/02* | (2006.01) |

(52) U.S. Cl.
CPC .............. *E02F 3/4075* (2013.01); *E02F 3/422* (2013.01); *E02F 9/226* (2013.01); *E02F 9/2271* (2013.01); *F04B 23/02* (2013.01)
USPC ............................................. 37/445; 414/726

(58) Field of Classification Search
USPC ............ 37/398, 442, 444, 445; 414/726, 565, 414/699, 706, 715, 686–692; 60/469; 188/307, 312, 317, 322.11, 322.2, 188/71.1, 72.1, 72.4; 267/236, 137, 217
See application file for complete search history.

(56) References Cited

U.S. PATENT DOCUMENTS

| | | | |
|---|---|---|---|
| 3,219,213 | A | 11/1965 | Learmont |
| 3,243,063 | A | 3/1966 | Learmont |
| 3,738,513 | A | 6/1973 | Wagner |
| 5,735,067 | A | 4/1998 | Isley et al. |
| 5,839,213 | A | 11/1998 | Abbott et al. |

(Continued)

FOREIGN PATENT DOCUMENTS

JP            61207728            9/1986

OTHER PUBLICATIONS

PCT/US2013/049747 International Search Report and Written Opinion dated Jan. 3, 2014 (8 pages).

*Primary Examiner* — Robert Pezzuto
(74) *Attorney, Agent, or Firm* — Michael Best & Friedrich LLP

(57) ABSTRACT

A dipper assembly for a mining shovel includes a dipper body, a dipper door pivotably coupled to the dipper body, an arm, a housing coupled to one of the body and the door, and a piston. The arm includes a first end pivotably coupled to the body and a second end pivotably coupled to the door. The movement of the door relative to the body drives the arm to pivot relative to the body. The housing includes an inlet in fluid communication with a fluid source, an outlet, and a cylinder partially defining a pump chamber in fluid communication with the inlet and the outlet. The piston is movable within the cylinder and biased in a first direction. The pivoting movement of the arm causes the piston to move in a second direction opposite the first direction. The movement of the piston changes a volume of the pump chamber.

24 Claims, 11 Drawing Sheets

(56) References Cited

U.S. PATENT DOCUMENTS

| | | | |
|---|---|---|---|
| 5,974,705 A * | 11/1999 | Isley et al. | 37/444 |
| 6,219,946 B1 | 4/2001 | Soczka | |
| 8,732,994 B2 * | 5/2014 | Dube et al. | 37/445 |
| 2011/0239494 A1 | 10/2011 | Dube et al. | |
| 2012/0260538 A1 | 10/2012 | Schob et al. | |

* cited by examiner

LUBRICATION PUMP

CROSS-REFERENCE TO RELATED APPLICATIONS

This application claims the benefit of U.S. Provisional Patent Application No. 61/669,366, filed Jul. 9, 2012, the entire contents of which are incorporated herein by reference.

BACKGROUND

The present invention relates to the field of mining shovels. Specifically, the present invention discloses a lubrication pump.

Conventional electric mining shovels include multiple pinned joint connections, and lubricating these joints often requires manual application of grease by an operator. In some cases, the shovel may include multiple powered systems to distribute lubrication to all of the necessary joints. In other cases, pin joints that cannot be easily connected to a lube distribution system are not lubricated resulting in excessive wear rates or large joints designed for dry operation. These systems increase the complexity of the shovel, increasing cost and maintenance.

SUMMARY

In one embodiment, the invention provides a dipper assembly for a mining shovel including a fluid source. The dipper assembly includes a body defining an opening, a door pivotably coupled to the body to selectively close the opening, an arm, a housing coupled to one of the body and the door, and a piston. The arm includes a first end pivotably coupled to the body and a second end pivotably coupled to the door. The movement of the door relative to the body drives the arm to pivot relative to the body. The cylinder includes an inlet configured to be in fluid communication with the fluid source, an outlet, and a cylinder partially defining a pump chamber in fluid communication with the inlet and the outlet. The piston is movable within the cylinder and biased in a first direction. The pivoting movement of the arm causes the piston to move in a second direction opposite the first direction. The movement of the piston changes a volume of the pump chamber.

In another embodiment, the invention provides fluid pump for an earthmoving machine including a fluid source and an attachment having a first portion and a second portion pivotably coupled to the first portion. The fluid pump includes an arm having a first end and a second end, a first pump assembly, and a second pump assembly. The arm is configured to be pivotably driven about the first end by movement of the first portion relative to the second portion. The first pump assembly includes a first inlet configured to be in fluid communication with the fluid source, a first outlet, a first cylinder at least partially defining a first pump chamber in fluid communication with the first inlet and the first outlet, and a first piston positioned within the first cylinder. The first piston is movable relative to the first cylinder and is biased toward a first position. The pivoting movement of the arm moves the first piston away from the first position and changes the volume of the first pump chamber. The second pump assembly includes a second inlet configured to be in fluid communication with the fluid source, a second outlet, a second cylinder at least partially defining a second pump chamber in fluid communication with the second inlet and the second outlet, and a second piston positioned within the second cylinder. The second piston is movable relative to the second cylinder and is biased toward a second position. The pivoting movement of the arm moves the second piston away from the second position and changes the volume of the second pump chamber.

In yet another embodiment, the invention provides an attachment for a mining shovel including a fluid source. The attachment includes a first portion, a second portion pivotably coupled to the first portion, a link coupled between the first portion and the second portion, a cylinder coupled to one of the first portion and the second portion, a first spring biased in a first direction, and a piston movable within the cylinder and biased in the first direction by the spring. The movement of the first portion relative to the second portion drives the link to pivot about an axis. The cylinder includes an inlet configured to be in fluid communication with the fluid source and an outlet. The cylinder at least partially defines a pump chamber in fluid communication with the inlet and the outlet. The pivoting movement of the link causes the piston to move in a second direction opposite the first direction. The movement of the piston changes a volume of the pump chamber.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical or hydraulic connections or couplings, whether direct or indirect. Also, electronic communications and notifications may be performed using any known means including direct connections, wireless connections, etc.

Figure 1:
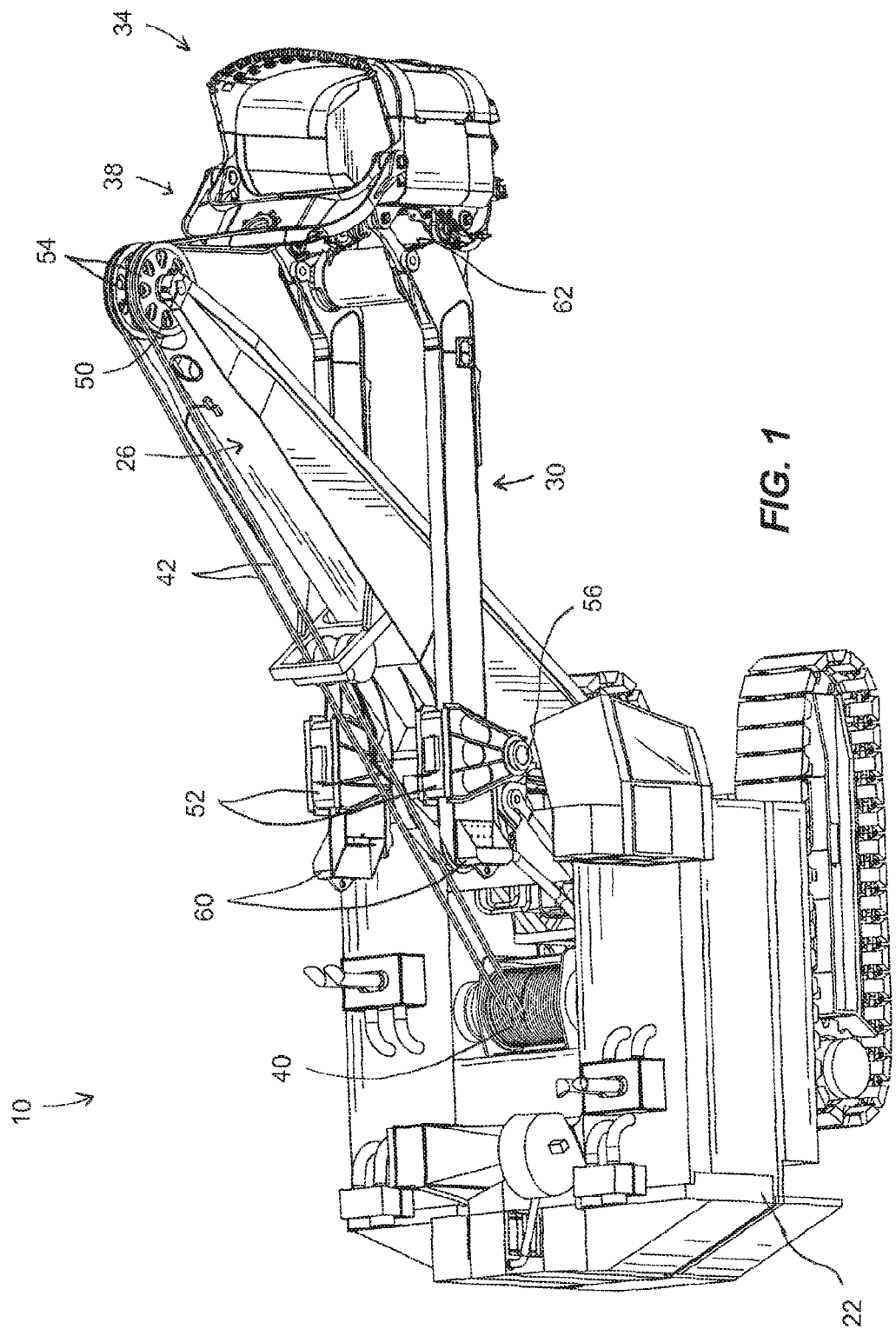
FIG. 1 is a side view of a mining shovel.

FIG. 1 illustrates an earthmoving machine such as a mining shovel 10 including a base 22, a boom 26, an elongated member or handle 30, an attachment or dipper 34 coupled to the handle 30, and a bail assembly 38 coupled to the dipper 34. The base 22 includes a hoist drum 40 for reeling in and paying out a cable or rope 42. The boom 26 includes a first end (not shown) coupled to the base 22, a second end 50 positioned away from the base 22, saddle blocks 52, a boom sheave 54 coupled to the second end 50, and a shipper shaft 56. In the illustrated embodiment, a support member (not shown) limits or dampens the pivoting movement of the boom 26 relative to the base 22. In other embodiments, the boom 26 is supported by a gantry or similar structure.

The handle 30 is moveably coupled to the boom 26 and includes a first end 60 and a second end 62. The first end 60 is movably received in the saddle blocks 52, and the handle passes through the saddle block 52 such that the handle 30 is configured for rotational and translational movement relative to the boom 26. State another way, the handle 30 is linearly extendable relative to the saddle block 52 and is rotatable about the shipper shaft 56.

The rope 42 is secured to the hoist drum 40, passes over the boom sheave 54, and is coupled to the dipper 34 by the bail assembly 38. The dipper 34 is raised or lowered relative to the boom sheave 54 as the rope 42 is reeled in or paid out, respectively, by the hoist drum 40. In the illustrated embodiment, the dipper 34 is fixed relative to the handle 30. In other embodiments, the dipper 34 is a bucket or other attachment that is pivotable relative to the handle 30 about the second end 62. In other embodiments, the bucket is a clamshell bucket including a body that is pivotably coupled to a baseplate by a link or pin.

Figure 2:
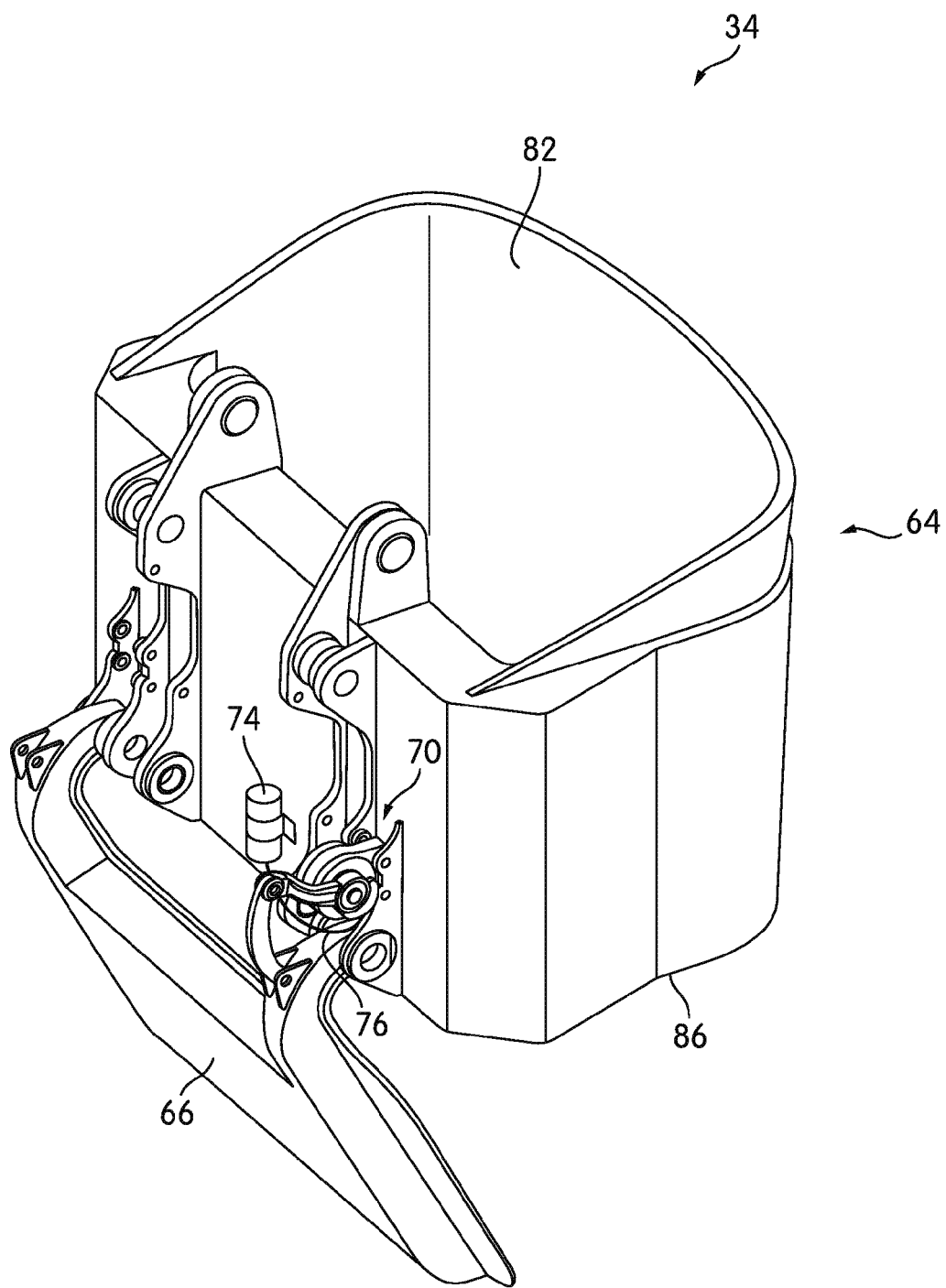
FIG. 2 is a rear perspective view of a dipper.
Figure 3:
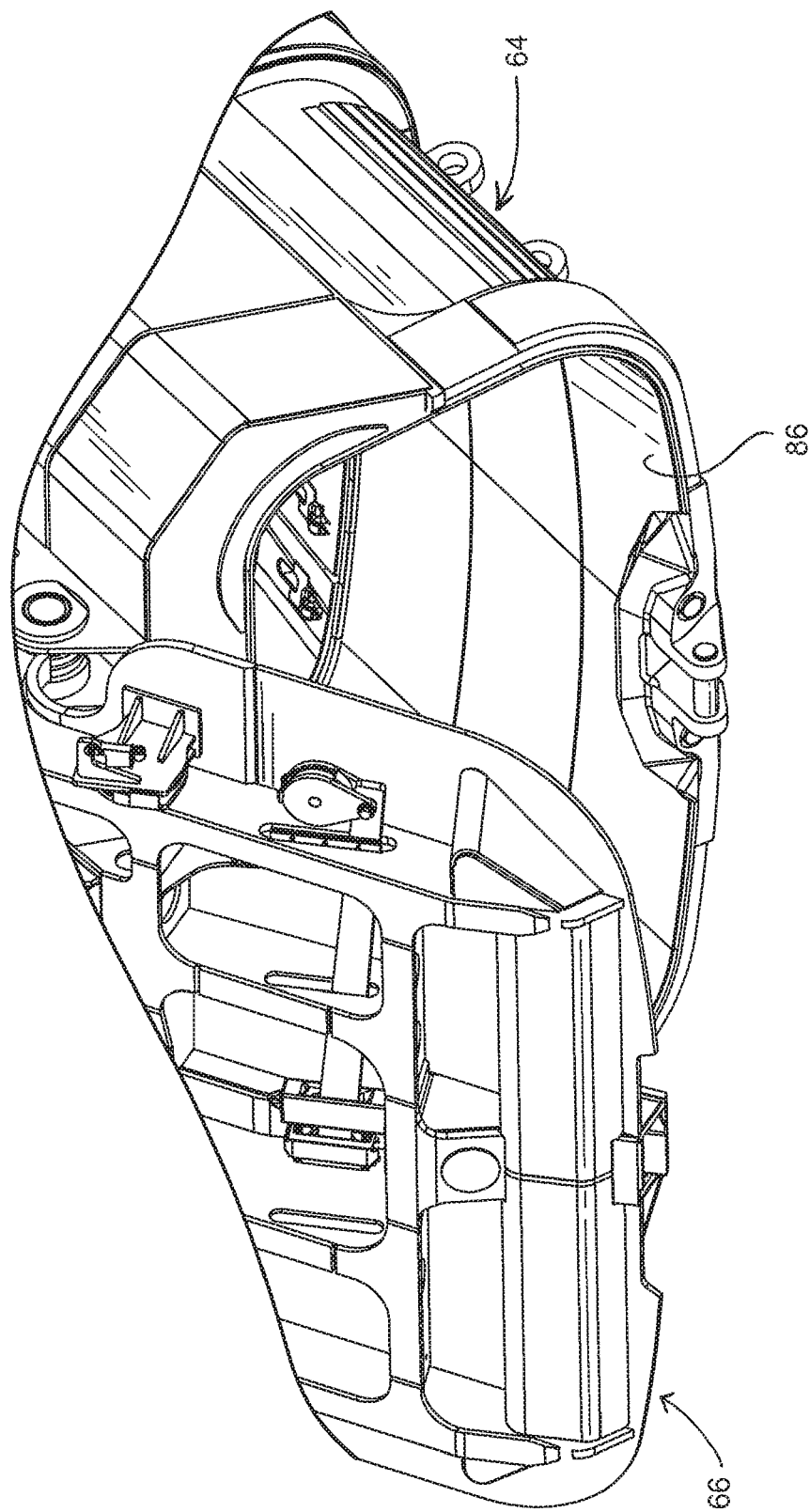
FIG. 3 is a lower perspective view of the dipper of FIG. 2.

As shown in FIGS. 2 and 3, the dipper 34 includes a first portion or body 64, a second portion or baseplate or door 66 pivotably coupled to the body 64, a fluid damper or snubber 70 for dampening rotation of the dipper door 66, a fluid source or reservoir 74, and a lubrication pump 78 (FIG. 4) in fluid communication with the reservoir 74 via a fluid line 76. The dipper body 64 includes a material receiving opening 82 (FIG. 2) and a material discharging opening 86 (FIG. 3). The dipper door 66 pivots between a closed position (shown in FIG. 1) to close the discharging opening 86 and an opened position (shown in FIG. 2) to open the discharging opening 86 and release the contents of the dipper body 64.

Figure 4:
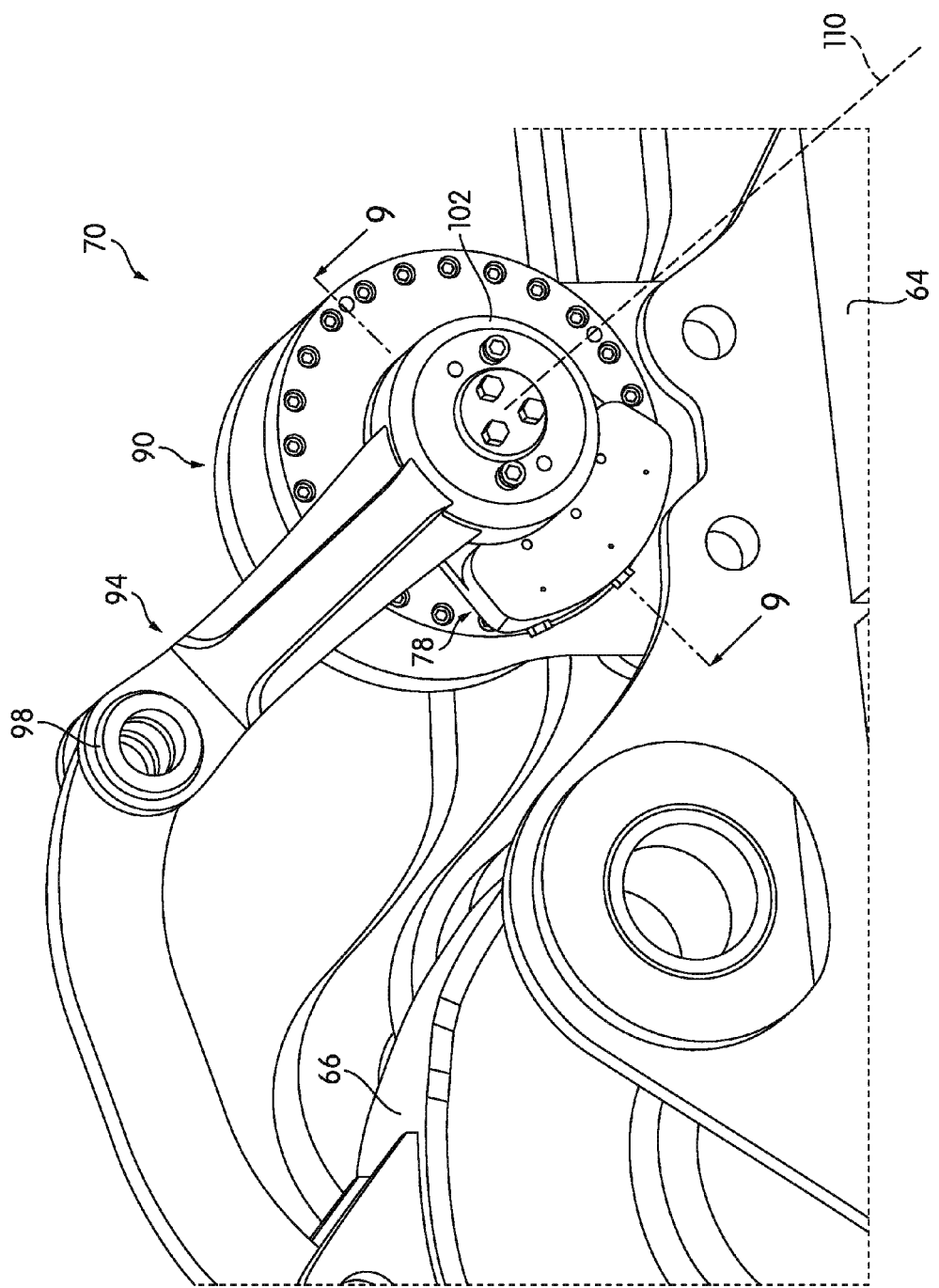
FIG. 4 is a perspective view of a snubber assembly.
Figure 5:
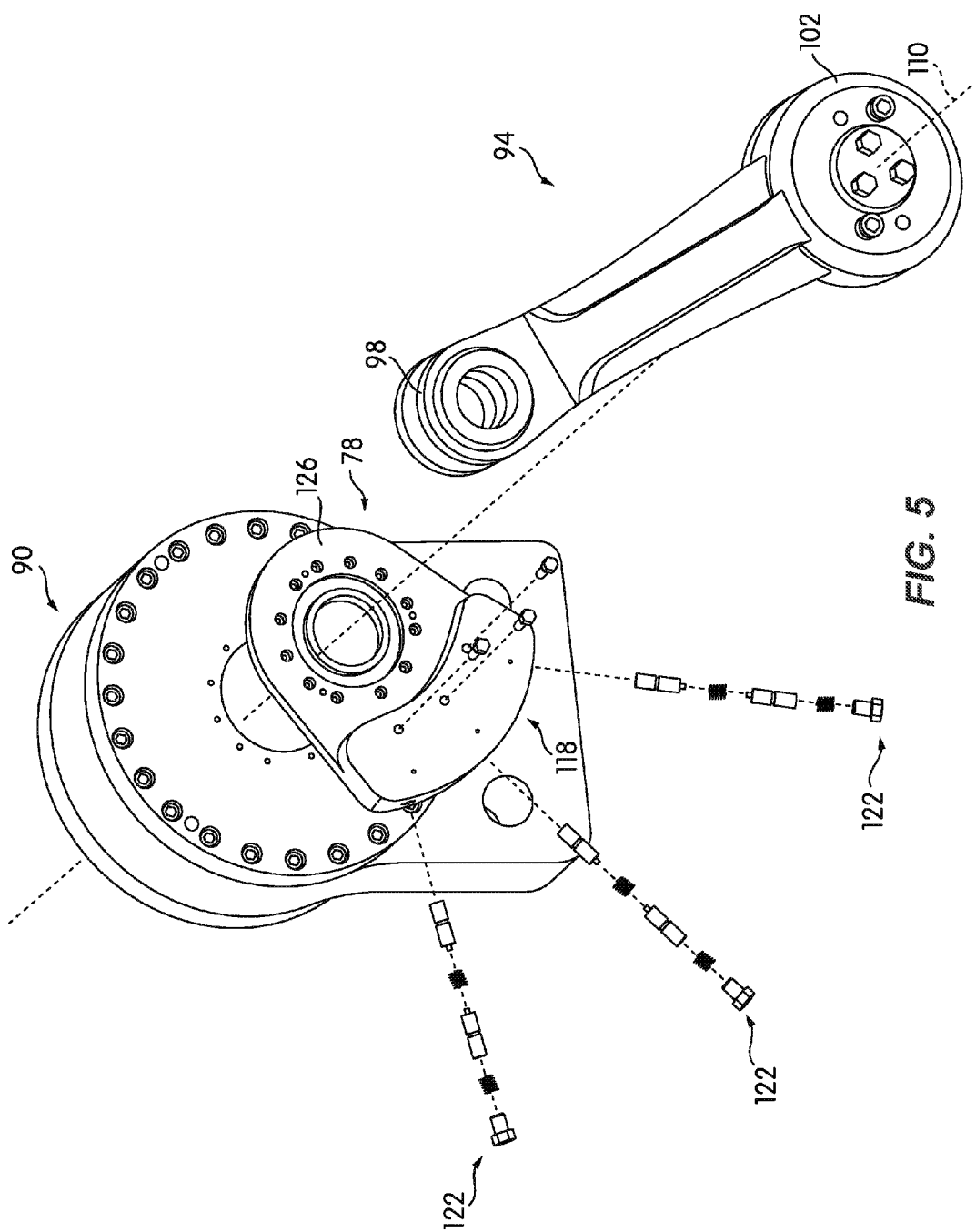
FIG. 5 is an exploded view of the snubber assembly of FIG. 4.
Figure 6:
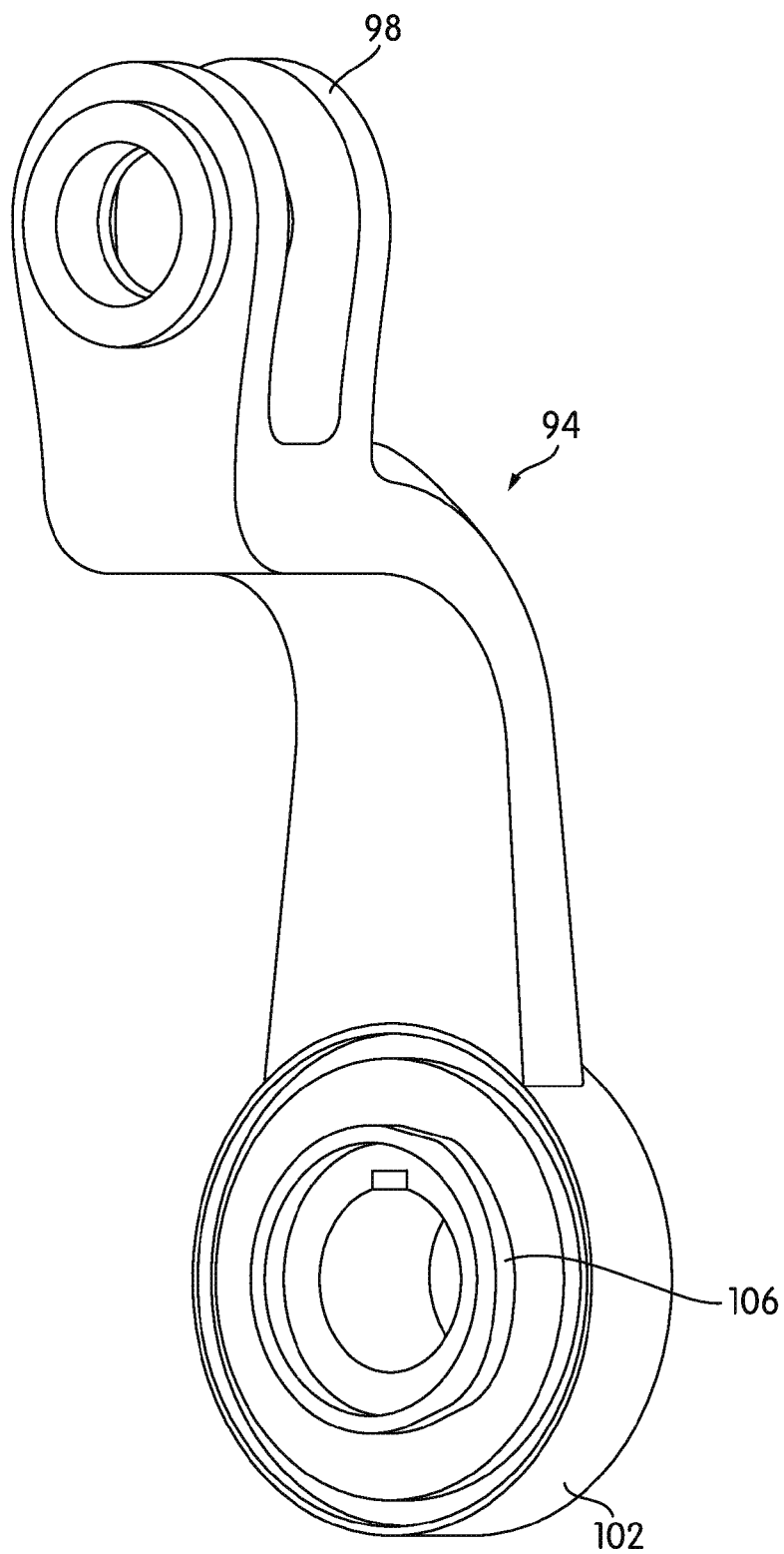
FIG. 6 is a perspective view of a snubber arm.

Referring to FIGS. 4 and 5, the snubber 70 includes a housing 90 and a link or arm 94 that is pivotably supported by the housing 90. The arm 94 includes a first end 98, a second end 102 coupled to the snubber housing 90, and a cam 106 (FIG. 6) coupled to the second end 102 proximate the housing 90. In the illustrated embodiment, the housing 90 is coupled to the dipper body 64 and the first end 98 of the arm 94 is coupled to the dipper door 66. In other embodiments, the housing 90 may be coupled to the dipper door 66 and the arm 94 is coupled to the dipper body 64. Also, in the illustrated embodiment, the cam 106 extends through an angle of approximately 80 degrees about the rotational axis 88. In other embodiments, the cam 106 extends through an angle of between 45 degrees and 120 degrees about the rotational axis 88. In still other embodiments, the cam 106 extends through an angle of between 5 degrees and 180 degrees about the rotational axis 88. The movement of the door 66 between the opened and closed positions pivots the arm 94 relative to the housing 90 about an axis 110. The snubber 70 dampens the movement of the arm 94, which in turn dampens the motion of the dipper door 66. The snubber 70 is generally similar to the snubber described in U.S. Patent Application No. 2012/0260538, published Oct. 18, 2012, the entire contents of which are incorporated herein by reference. In other embodiments, the internal components of the snubber 70 may be different.

Referring again to FIG. 2, the reservoir 74 stores a lubrication medium or lubricant, such as grease. In some embodiments, the lubricant includes a liquid, solid, or semi-solid lubricant. The reservoir 74 is formed as a cylinder including a bore, a plunger, and a spring. The lubricant is stored in the bore, and the spring and plunger are positioned in the bore to provide a positive pressure on the lubricant and to prevent the introduction of foreign fluids (particularly compressible fluids such as air, for example) into the lubricant. In the illustrated embodiment, the reservoir 74 is coupled to a top surface of the dipper 34, such as by welding. In one embodiment, the bore is formed from drawn-over mandrel ("DOM") tubing and is sized such that the pump 78 can operate during 500 hours of service by the dipper before requiring replenishment of the lubricant. Other embodiments may include a reservoir connected to an accumulator (spring, gas, gas-bladder or other accumulator method) that provides a low pressure charging system for the lubricant supplied to the pump 78.

As shown in FIG. 5, the pump 78 is coupled to the snubber 70. In the illustrated embodiment, the pump 78 extends in an arcuate manner along a portion of an outer surface of the snubber housing 90, such that the pump 78 is at least partially concentric relative to the arm 94. In other embodiments, the pump 78 is coupled directly to either the dipper body 64 or the dipper door 66. The pump 78 is actuated by the cam 106 (FIG. 6), which pivots with the arm 94. In addition, the connection of the arm 94 to the snubber 70 also dampens the operation of the pump 78, which improves the operation of a positive displacement or semi-positive displacement pump. Also, in the illustrated configuration, the relative proximity of the pump 78 and the snubber housing 90 allows the heat generated by the snubber 70 during dampening to be transferred to the lubricant. This heat transfer lowers the lubricant's effective viscosity and increases flow rate, which is particularly advantageous in cold conditions.

Figure 7:
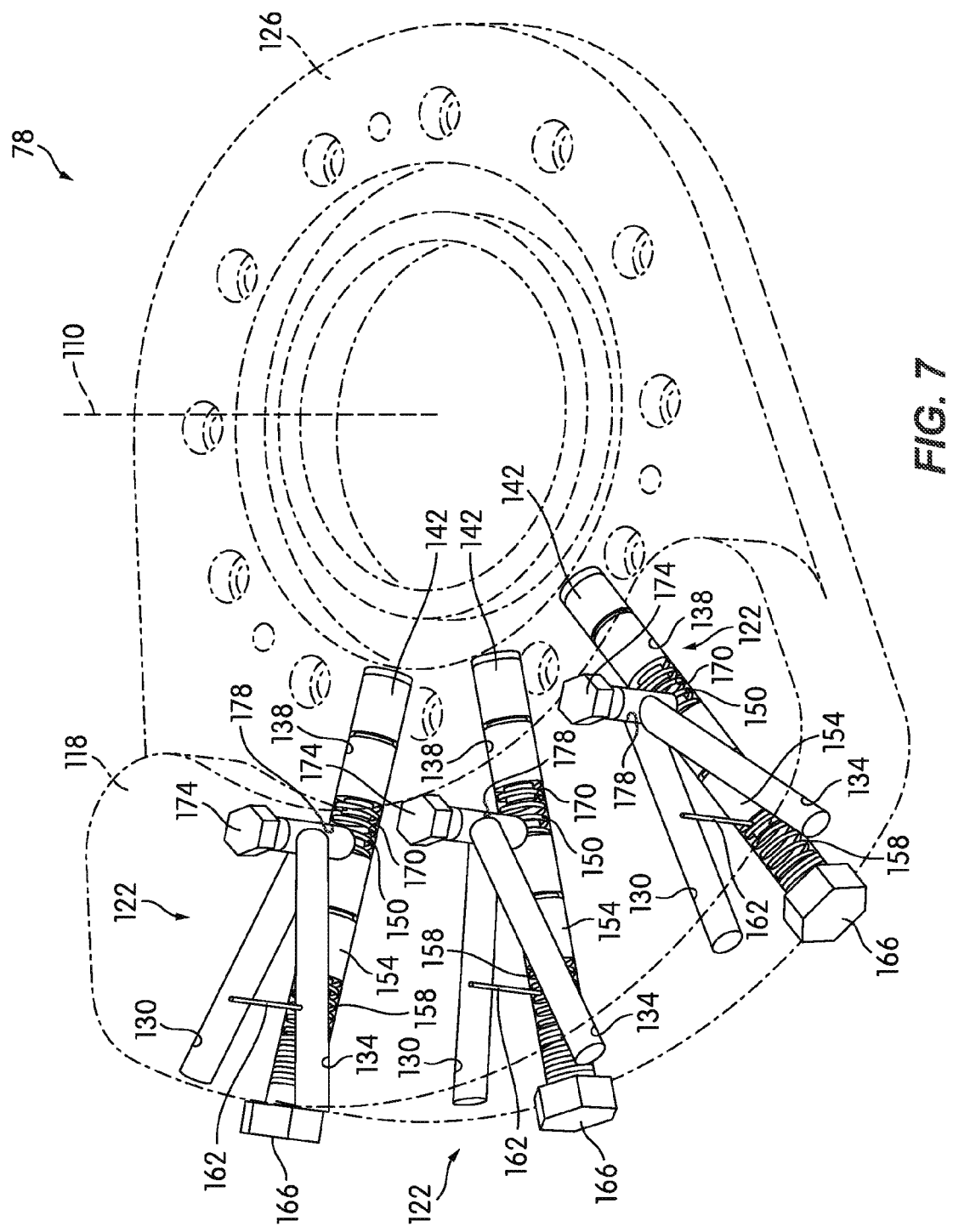
FIG. 7 is a perspective view of a pump.
Figure 8:
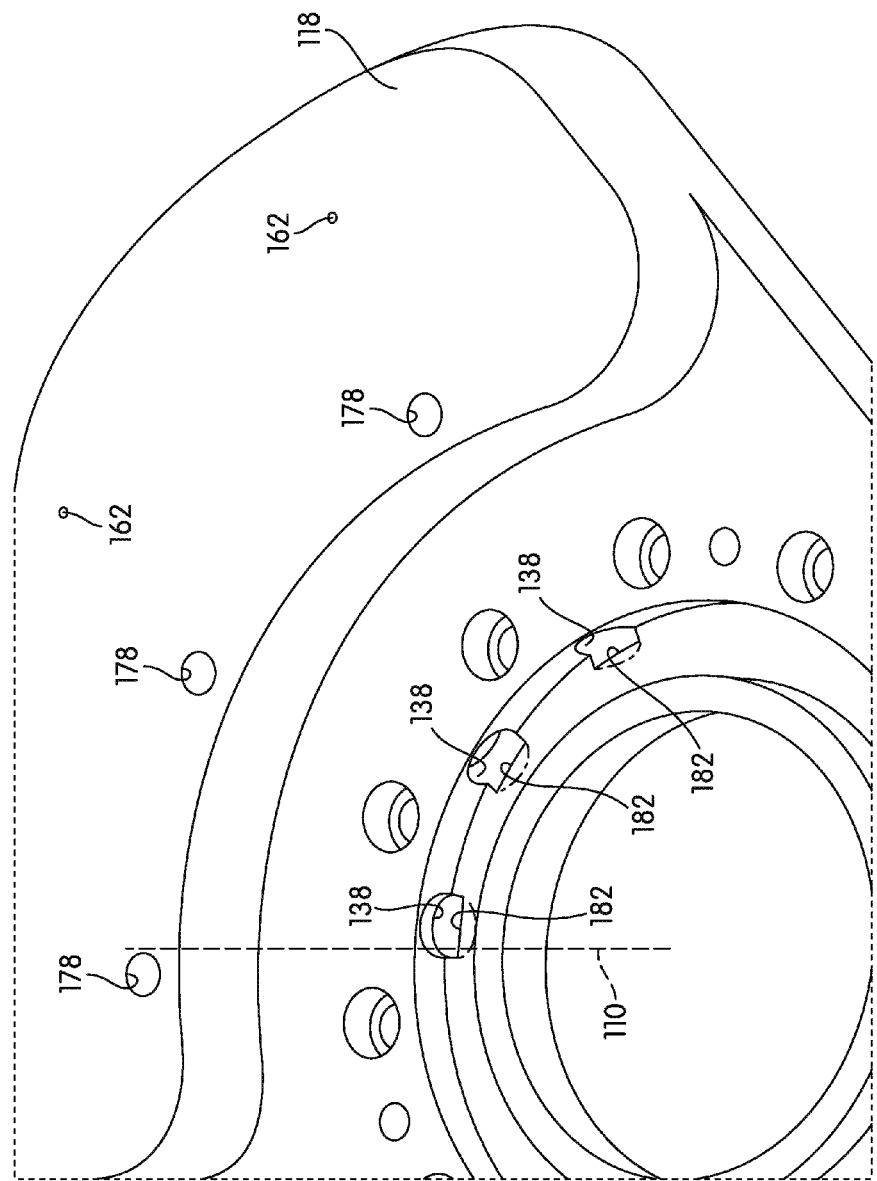
FIG. 8 is an enlarged view of a portion of a housing of the pump of FIG. 7.

Referring to FIGS. 7 and 8, the pump 78 includes a housing 118, three pump assemblies 122, and a mounting bracket 126 for engaging the snubber arm 94 (FIG. 5). The mounting bracket 126 couples the pump 78 to the snubber housing 90. In the illustrated embodiment, the pump 78 includes three pump assemblies 122. In other embodiments, the pump 78 includes fewer or more pump assemblies 122. The angle of the cam 106 may be altered depending on the number of pump assemblies 122.

As shown in FIG. 7, each pump assembly 122 includes an inlet 130 for receiving the lubricant, an outlet 134 in fluid communication with a joint (not shown) to be lubricated, a cylinder or bore 138, a first or follower piston 142 positioned within the bore 138, a first spring 150 biasing the follower piston 142, a second piston 154 positioned within the bore 138, a second spring 158 biasing the second piston 154, a breather port 162 for permitting air to enter or escape as necessary, an adjustment member 166, and a pump chamber 170. In the illustrated embodiment, the inlet 130, the outlet 134, and the bore 138 are formed in the housing 118. Also, in one embodiment, the first spring 150 and the second spring 158 have the same spring constant. In other embodiments, the spring constants may be unequal to provide adjustable operating parameters. The adjustment member 166 retains the pistons 142, 154 and springs 150, 158 within the bore 138 and controls the actuation pressure, or the responsiveness of the follower piston 142 to the cam 106. The adjustment member 166 biases the spring 158 against the second piston 154. The adjustment member 166 is movable to adjust the compression force or pre-load on the second spring 158. The movement of the adjustment member 166 also adjusts the compression force on the first spring 150, thereby adjusting the response characteristics of the pistons 142, 154 to the cam 106. In the illustrated embodiment, the adjustment member 166 is a screw or other threaded fastener. A sealing fastener 174 is included to seal a port 178 providing fluid communication between the inlet 130, the outlet 134, and the pump chamber 170.

Figure 9:
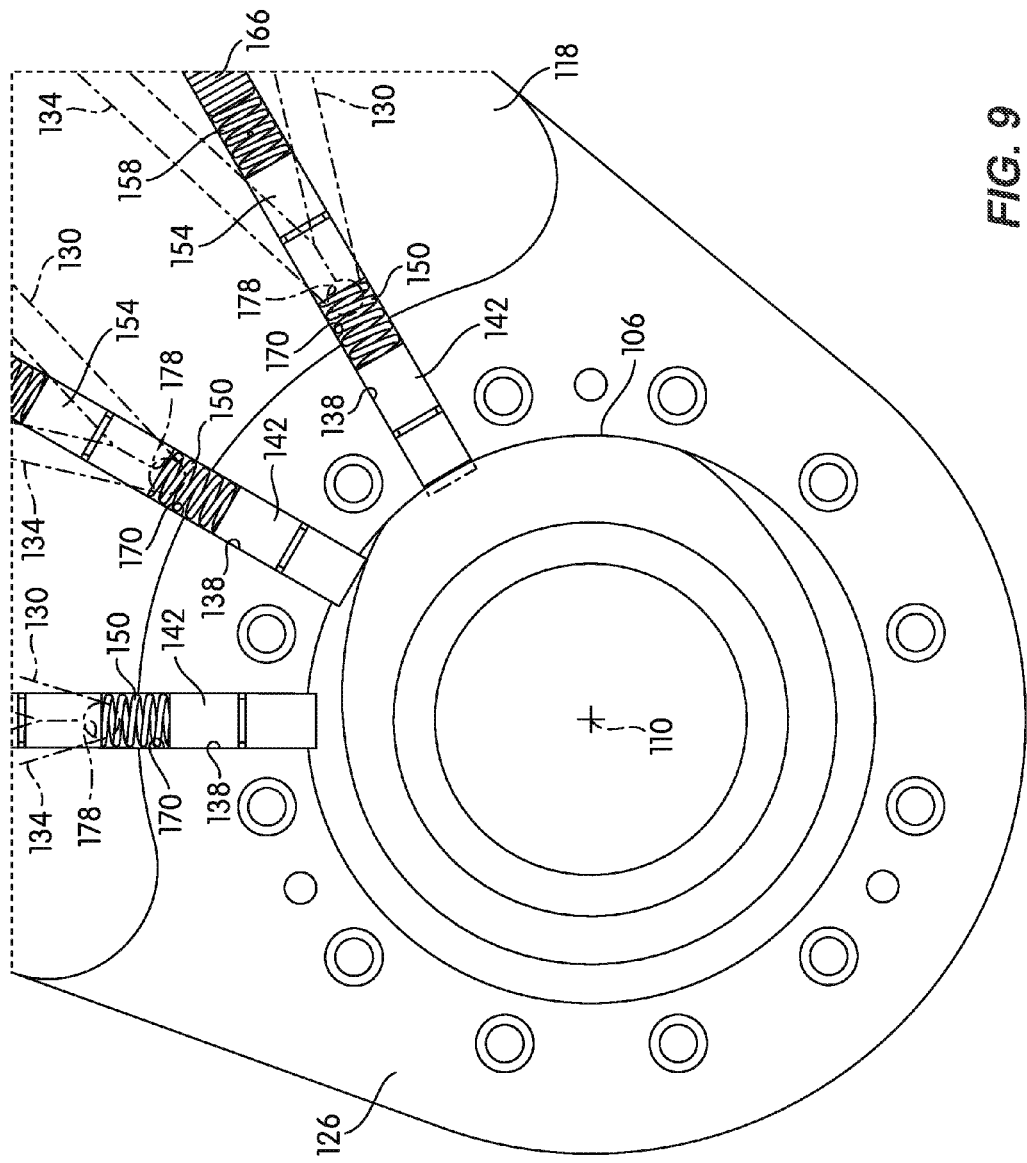
FIG. 9 is a cross-section view of the snubber assembly of FIG. 4 viewed along section 9-9.

In the illustrated embodiment, the bore 138 of each pump assembly 122 is arranged along a line that is perpendicular to the axis 110 of the snubber arm 94 (i.e., the pump assemblies 122 are positioned in a plane that is substantially normal to the axis 110). Referring to FIG. 9, the follower piston 142 is biased toward the cam 106 by the first spring 150. Each pump assembly 122 includes a piston stop 182 (FIG. 8) for limiting the maximum travel of the follower piston 142 against the cam 106 and controlling or metering the intake volume of the pump chamber 170. In the illustrated embodiment, the piston stop 182 is formed by a portion of the housing 118 extending into a portion of the bore 138.

As shown in FIG. 9, the follower piston 142 is positioned in the bore 138 in series with the second piston 154, and the pistons 142, 154 are separated by the first spring 150. The pump chamber 170 is defined by a volume or space within the bore 138 and between the follower piston 142 and the second piston 154. The inlet 130 and the outlet 134 are in fluid communication with the pump chamber 170. As the follower piston 142 moves within the bore 138 relative to the second piston 154, the boundaries of the pump chamber 170 expand and contract, causing the volume of the pump chamber 170 to increase and decrease and thereby change the pressure in the pump chamber 170. The pressure fluctuation draws in the lubricant through the inlet 130 until the lubricant passes the port 178 and moves to the outlet 134. The pressure fluctuation then pumps the lubricant out through the outlet 134, delivering the lubricant to a mechanical coupling or joint.

Each piston 142, 154 includes a recess 186 for receiving an O-ring seal (not shown) to seal the pump chamber 170 with respect to the rest of the bore 138. In the illustrated embodiment, each piston 142, 154 includes a projection 190 positioned within the pump chamber 170 to decrease the volume of the pump chamber 170. In other embodiments, the pistons 142, 154 may include recesses to increase the volume of the pump chamber 170. In still other embodiments, the follower piston 142 may include a small hole extending through the length of the follower piston 142 such that a portion of the lubricant is pumped to the cam 106.

The inlet 130 and outlet 134 each include a check valve (not shown) for controlling the direction of the flow of the lubricant through the pump assembly 122. The check valves permit simpler replacement of sensitive pump components when necessary. The check valves also allow an operator to purge the pump assemblies 122 and the pump 78 without actuating the pump 78. The purging process can be accomplished by using a grease gun, for example, on the inlet 130 or outlet 134 of each pump assembly 122.

Each pump assembly 122 provides a flow path for the lubricant that is independent of flow paths associated with the other pump assemblies 122. Each flow path includes a positive displacement follower piston 142 to drive the lubricant. The follower piston 142 includes a relatively large face to reduce wear on the cam 106. Furthermore, each pump assembly 122 provides a lubrication line, and in the event one of the lubrication lines becomes blocked, the pump 78 does not generate sufficient pressure to damage the internal pump components or lubrication lines.

Figure 10:
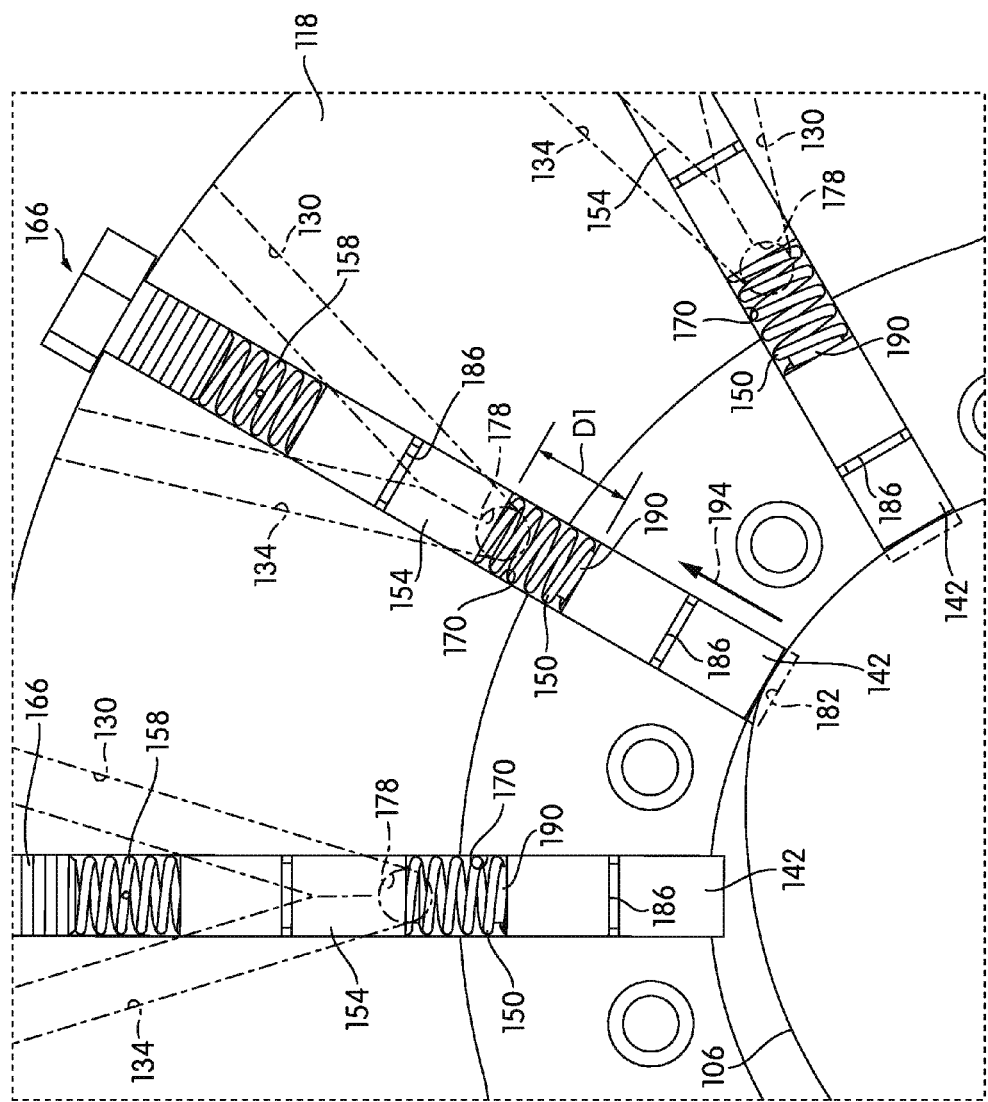
FIG. 10 is an enlarged section view of the snubber assembly of FIG. 9 with a piston in a retracted state.
Figure 11:
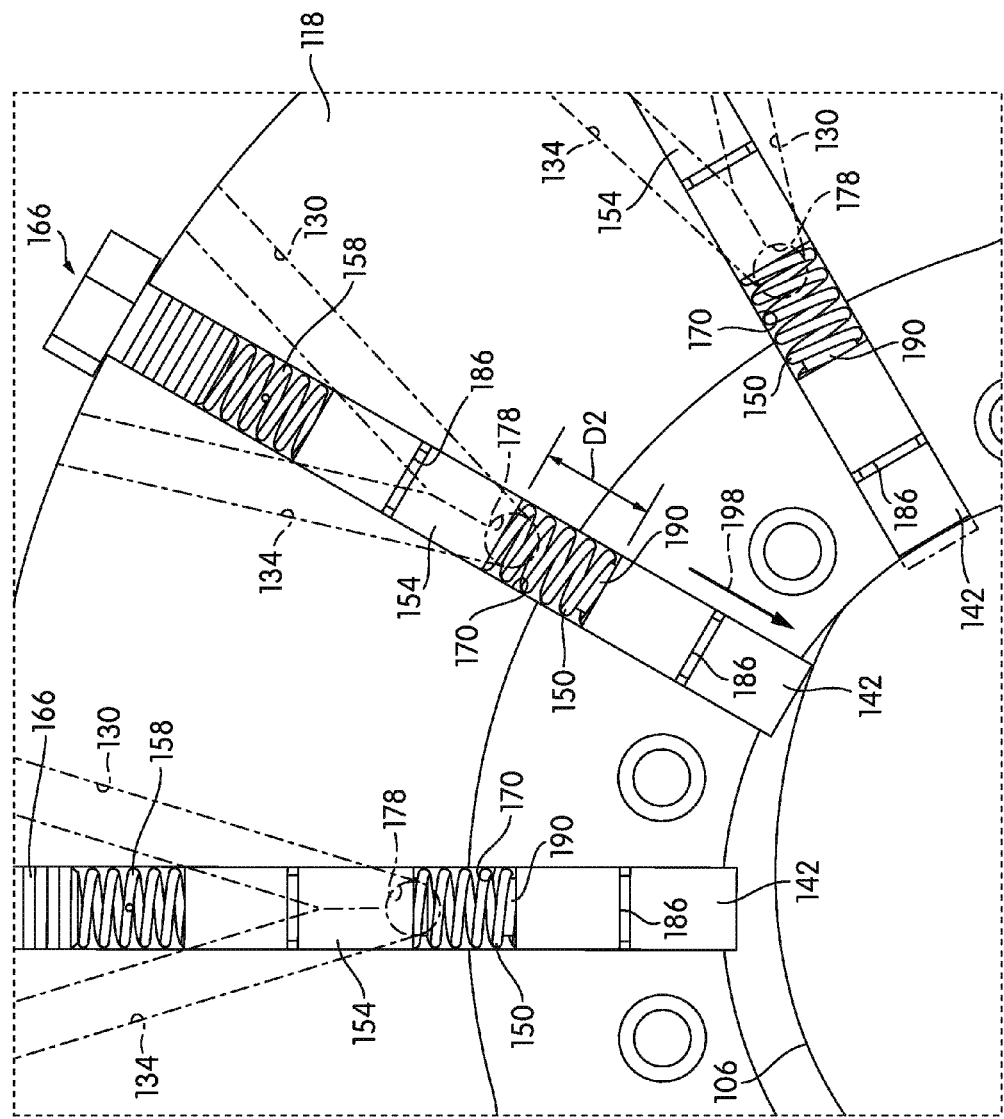
FIG. 11 is an enlarged section view of the snubber assembly of FIG. 9 with a piston in an extended state.

Referring to FIGS. 10 and 11, during operation of the shovel 10, the dipper door 66 is moved between the opened position and the closed position, causing the snubber arm 94 to pivot relative to the snubber housing 90. The cam 106 (FIG. 5) is positioned proximate the second end 102 of the snubber arm 94 and is driven by rotation of the arm 94. As the cam 106 rotates, the cam 106 sequentially engages each follower piston 142, pushing the piston 142 against the first spring 150 in a first direction 194. Once the cam 106 moves past the follower piston 142, the first spring 150 biases the piston 142 in a second direction 198 to return to the piston's 142 original position. The follower piston 142 reciprocates between a first or compressed position (FIG. 10) in which the pump chamber 170 has a length D1 and a second or extended position (FIG. 11) in which the pump chamber 170 has a length D2 that is longer than D1. If the springs 150, 158 have the same spring constants, the second piston 154 will travel half as far as the follower piston 142. The difference in volume in the pump chamber 170 will therefore be equal to the diameter of the bore 138 multiplied by the difference between D1 and D2.

The rotation of the arm 102 and the cam 106 provide a prescribed motion that is driven by the pivoting motion of the dipper door 66 and is capable of generating large forces on each pump assembly 122. These large forces could create a drastic pressure increase behind the follower piston 142 (i.e., back pressure resisting the movement of the piston 142 when it engages the cam 106, due in part to the viscosity of the lubricant). However, the combination of the first spring 150 and the second spring 158 permits the follower piston 142 to follow the motion of the cam 106 and allows the second piston 154 to follow the motion of the follower piston 142, providing a movable "cushion" to reduce the pressure increase. Once the door 66 reaches its end point (i.e., once the door 66 reaches the closed or open position), the second spring 158 urges the second piston 154 and the first spring 150 toward an equilibrium position. The forces exerted by the first spring 150 and the second spring 158 control the movement of the second piston 154 back toward the pump chamber 170, slowly pumping the lubricant out through the outlet 134 at a pressure controlled by the springs 150 and 158. The springs 150 and 158 also control the expansion of the pump chamber 170, permitting the pump chamber 170 to be slowly filled in order to charge the pump chamber 170 for the next rotation of the cam 106.

The reciprocation of the follower piston 142 causes the volume of the pump chamber 170 to change, thereby changing the pressure in the pump assembly 122. In addition, the check valves associated with the inlet 130 and the outlet 134 open and close to permit lubricant to flow into the pump chamber 170 from the inlet 130 and out through the outlet 134. This cycle alternatively draws in lubricant through the inlet 130 and pumps the lubricant out through the outlet 134.

The rotation of the arm 94 drives the reciprocating pump assembly 122, and therefore the pump 78 is operated by the motion of the dipper door 66 during the closing or opening motion. The pump 78 therefore does not require an external energy source such as batteries or other potential energy storage units or the associated transmission lines communicating between the energy storage units and the pump 78 on the dipper 34. The lack of an external power source permits the pump 78 to operate with fewer components, improving its reliability. The pump 78 lubricates dynamic pinned joints on a mining shovel dipper 34, utilizing energy generated by the dipper door 66 rather than requiring energy from an external power system, such as electrical, pneumatic, or hydraulic power systems.

Because the stroke length (that is, the distance D2−D1) is less than the solid height of the first spring 150, the pump assembly 122 prevents cavitation because the pump chamber 170 will not contract beyond a certain length as a result of negative pressure in the system. In addition, the second spring 158 provides additional relief in case of pressure build-up in the pumping mechanism, preventing the pump assembly 122 from reaching a burst pressure.

Thus, the invention provides, among other things, a hoist system for an industrial machine. Although the invention has been described in detail with reference to certain preferred embodiments, variations and modifications exist within the scope and spirit of one or more independent aspects of the invention as described. Various features and advantages of the invention are set forth in the following claims.

What is claimed is:

1. A dipper assembly for a mining shovel, the mining shovel including a fluid source, the dipper assembly comprising:
   a body defining an opening;
   a door pivotably coupled to the body to selectively close the opening;
   an arm including a first end pivotably coupled to the body and a second end pivotably coupled to the door, the movement of the door relative to the body driving the arm to pivot relative to the body;
   a housing coupled to one of the body and the door, the housing including an inlet configured to be in fluid communication with the fluid source, an outlet, and a cylinder partially defining a pump chamber in fluid communication with the inlet and the outlet; and
   a piston movable within the cylinder and biased in a first direction, the pivoting movement of the arm causing the piston to move in a second direction opposite the first direction, the movement of the piston changing a volume of the pump chamber.

2. The dipper assembly of claim 1, wherein the first end of the arm includes a cam positioned adjacent the piston, wherein the pivoting movement of the arm drives the cam to move the piston in the second direction.

3. The dipper assembly of claim 2, wherein the first end of the arm is pivotable about an axis, and the cylinder is oriented along a radial line extending perpendicularly with respect to the axis.

4. The dipper assembly of claim 1, further comprising a fluid damper for dampening the movement of the dipper door relative to the dipper body, the damper being operated by movement of the arm.

5. The dipper assembly of claim 4, wherein the housing is coupled to a surface of the fluid damper to facilitate heat exchange between the fluid in the housing and the fluid in the damper.

6. The dipper assembly of claim 1, further comprising
   a spring biasing the piston in the first direction; and
   an adjustment member biasing the spring in the first direction, wherein the adjustment member is movable to adjust a compression force exerted on the spring.

7. The dipper assembly of claim 1, wherein the piston is a first piston and the dipper assembly further comprises a second piston positioned within the cylinder and biased in the first direction, wherein the cylinder, the first piston, and the second piston define the pump chamber.

8. The dipper assembly of claim 7, further comprising
   a first spring biasing the first piston in the first direction;
   a second spring biasing the second piston in a second direction; and
   an adjustment member biasing the second spring in the second direction, wherein the adjustment member is movable to adjust a compression force exerted on the second spring.

9. The dipper assembly of claim 8, wherein the first spring is positioned between the first piston and the second piston.

10. A fluid pump for an earthmoving machine, the machine including a fluid source and an attachment including a first portion and a second portion pivotably coupled to the first portion, the fluid pump comprising:
    an arm including a first end and a second end, the arm configured to be pivotably driven about the first end by movement of the first portion relative to the second portion;
    a first pump assembly including
      a first inlet configured to be in fluid communication with the fluid source,
      a first outlet,
      a first cylinder at least partially defining a first pump chamber in fluid communication with the first inlet and the first outlet, and
      a first piston positioned within the first cylinder and movable relative to the first cylinder, the first piston biased toward a first position, the pivoting movement of the arm moving the first piston away from the first position and changing the volume of the first pump chamber; and
    a second pump assembly including
      a second inlet configured to be in fluid communication with the fluid source,
      a second outlet,
      a second cylinder at least partially defining a second pump chamber in fluid communication with the second inlet and the second outlet, and
      a second piston positioned within the second cylinder and movable relative to the second cylinder, the second piston biased toward a second position, the pivoting movement of the arm moving the second piston away from the second position and changing the volume of the second pump chamber.

11. The fluid pump of claim 10, wherein the arm is pivotable about an axis, wherein the first piston is movable within the first cylinder along a first line and the second piston is movable within the second cylinder along a second line, the first line and the second oriented perpendicularly with respect to the axis.

12. The fluid pump of claim 10, wherein the first end of the arm includes a cam positioned adjacent the first piston and the second piston, wherein the pivoting movement of the arm drives the cam to move the first piston away from the first position and to move the second piston away from the second position.

13. The fluid pump of claim 10, wherein the arm sequentially engages the first piston and then the second piston.

14. The fluid pump of claim 10, wherein the first pump assembly further includes a first spring biasing the first piston toward the first position and a first adjustment member biasing the first spring against the first piston, wherein the first adjustment member is movable to adjust a force exerted on the first spring,
    wherein the second pump assembly further includes a second spring biasing the second piston toward the second position and a second adjustment member biasing the second spring against the second piston, wherein the second adjustment member is movable to adjust a force exerted on the second spring.

15. The fluid pump of claim 10, wherein the first pump assembly further includes a third piston positioned within the first cylinder and biased toward the first piston, the first pump chamber being defined by a volume of the first cylinder between the first piston and the third piston.

16. The fluid pump of claim 15, wherein the first pump assembly further includes a first spring biasing the first piston toward the first position, a third spring biasing the third piston toward the first piston, and a first adjustment member biasing the third spring against the third piston, the first adjustment member being movable to modify a force exerted on the third spring and thereby adjust the biasing force exerted on the third piston, wherein the second pump assembly further includes a second spring biasing the second piston toward the second position, a fourth spring, a fourth piston positioned within the second cylinder and biased by the fourth spring toward the second piston, a volume of the second cylinder between the second piston and the fourth piston defining the second pump chamber, and a second adjustment member biasing the fourth spring against the fourth piston, the second adjustment member being movable to modify a force exerted on the fourth spring and thereby adjust the biasing force exerted on the fourth piston.

17. The fluid pump of claim 16, wherein the first spring is positioned between the first piston and the third piston, and the second spring is positioned between the second piston and the fourth piston.

18. An attachment for a mining shovel, the mining shovel including a fluid source, the attachment comprising:
a first portion;
a second portion pivotably coupled to the first portion;
a link coupled between the first portion and the second portion, the movement of the first portion relative to the second portion driving the link to pivot about an axis;
a cylinder coupled to one of the first portion and the second portion, the cylinder including an inlet configured to be in fluid communication with the fluid source and an outlet, the cylinder at least partially defining a pump chamber in fluid communication with the inlet and the outlet;
a first spring biased in a first direction; and
a piston movable within the cylinder and biased in the first direction by the spring, the pivoting movement of the link causing the piston to move in a second direction opposite the first direction, the movement of the piston changing a volume of the pump chamber.

19. The attachment of claim 18, wherein the link includes a cam positioned adjacent the piston, wherein the pivoting movement of the link drives the cam to move the piston in the second direction.

20. The attachment of claim 18, further comprising a fluid damper for dampening the movement of the first portion relative to the second portion, the damper being operated by movement of the link.

21. The attachment of claim 18, further comprising an adjustment member biasing the first spring in the first direction, wherein the adjustment member is movable to adjust a compression force exerted on the spring.

22. The attachment of claim 18, wherein the piston is a first piston and the attachment further comprises a second piston positioned within the cylinder and biased in the first direction, wherein a volume between the cylinder, the first piston, and the second piston defines the pump chamber.

23. The attachment of claim 22, further comprising a second spring biasing the second piston in the first direction, and an adjustment member biasing the second spring in the first direction, wherein the first spring is positioned between the first piston and the second piston and the second spring is positioned between the second piston and the adjustment member, wherein the adjustment member is movable to adjust a compression force exerted on the second spring.

24. The attachment of claim 18, wherein the first portion is a dipper body defining an opening, wherein the second portion is a dipper door pivotably coupled to the body to selectively close the opening, and wherein the link is an arm including a first end pivotably coupled to the dipper body and a second end pivotably coupled to the dipper door.

* * * * *